Dec. 1, 1970     A. A. HANSON     3,544,984
ALARM SYSTEM FOR DETECTING PHYSICAL DISTURBANCES OF ONE
OR MORE ELECTRICAL APPLIANCES AND THE LIKE FROM
A LOCATION REMOTE FROM SAID APPLIANCES
Filed Oct. 28, 1968     3 Sheets-Sheet 1

INVENTOR
ARCHIE ANDREW HANSON

BY

*Birch & Birch*

ATTORNEY

INVENTOR
ARCHIE ANDREW HANSON
BY
Birch & Birch
ATTORNEY

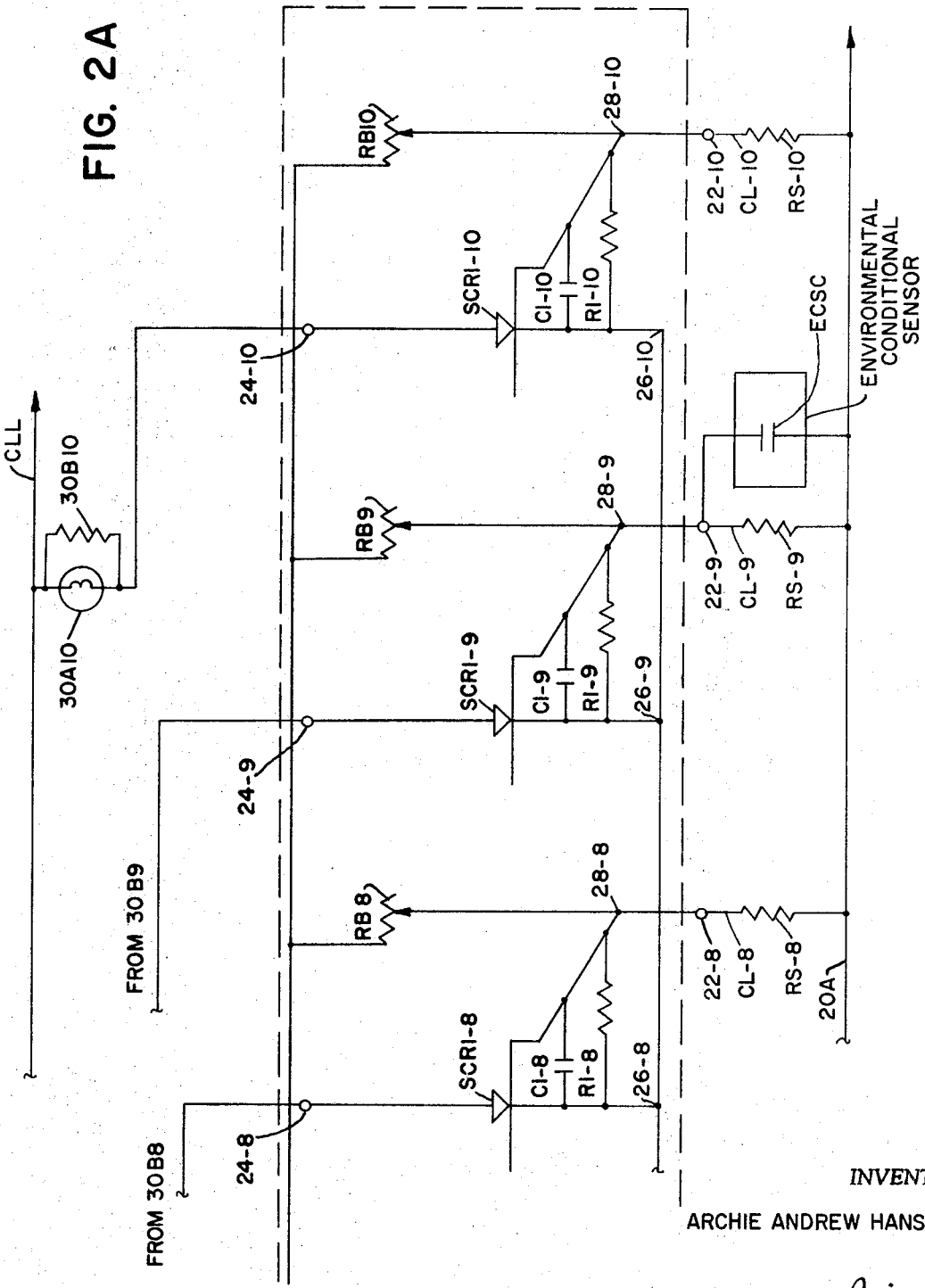

3,544,984
ALARM SYSTEM FOR DETECTING PHYSICAL DISTURBANCES OF ONE OR MORE ELECTRICAL APPLIANCES AND THE LIKE FROM A LOCATION REMOTE FROM SAID APPLIANCES
Archie A. Hanson, Orlando, Fla., assignor to Albright's Electronics, Inc., Maitland, Fla., a corporation of Florida
Filed Oct. 28, 1968, Ser. No. 771,259
Int. Cl. G08b 13/14, 25/00
U.S. Cl. 340—213.1                    17 Claims

ABSTRACT OF THE DISCLOSURE

An alarm system for the protection of electrical appliances from burglary and unauthorized tampering is provided which includes a centrally located master indicating panel containing the major portion of the alarm system. Each appliance being monitored includes an electric circuit component of the alarm system integrally incorporated therein in such a manner as to preclude defeating the system. Detection of attempted burglary or tampering is effected by alternating current bridge circuitry which is unbalanced by such attempted burglary or tampering. Solid-state switch devices are utilized to respond to the unbalance and effect an audible indication of a condition of an attempted burglary of or tampering with a given appliance and the visual indication of the location of that appliance. The device is readily adapted to detect the fact and location of fires and similar environmental conditions by associating a simple two-position switch type condition detector wih a single circuit element of the bridge circuit.

Figure 1:
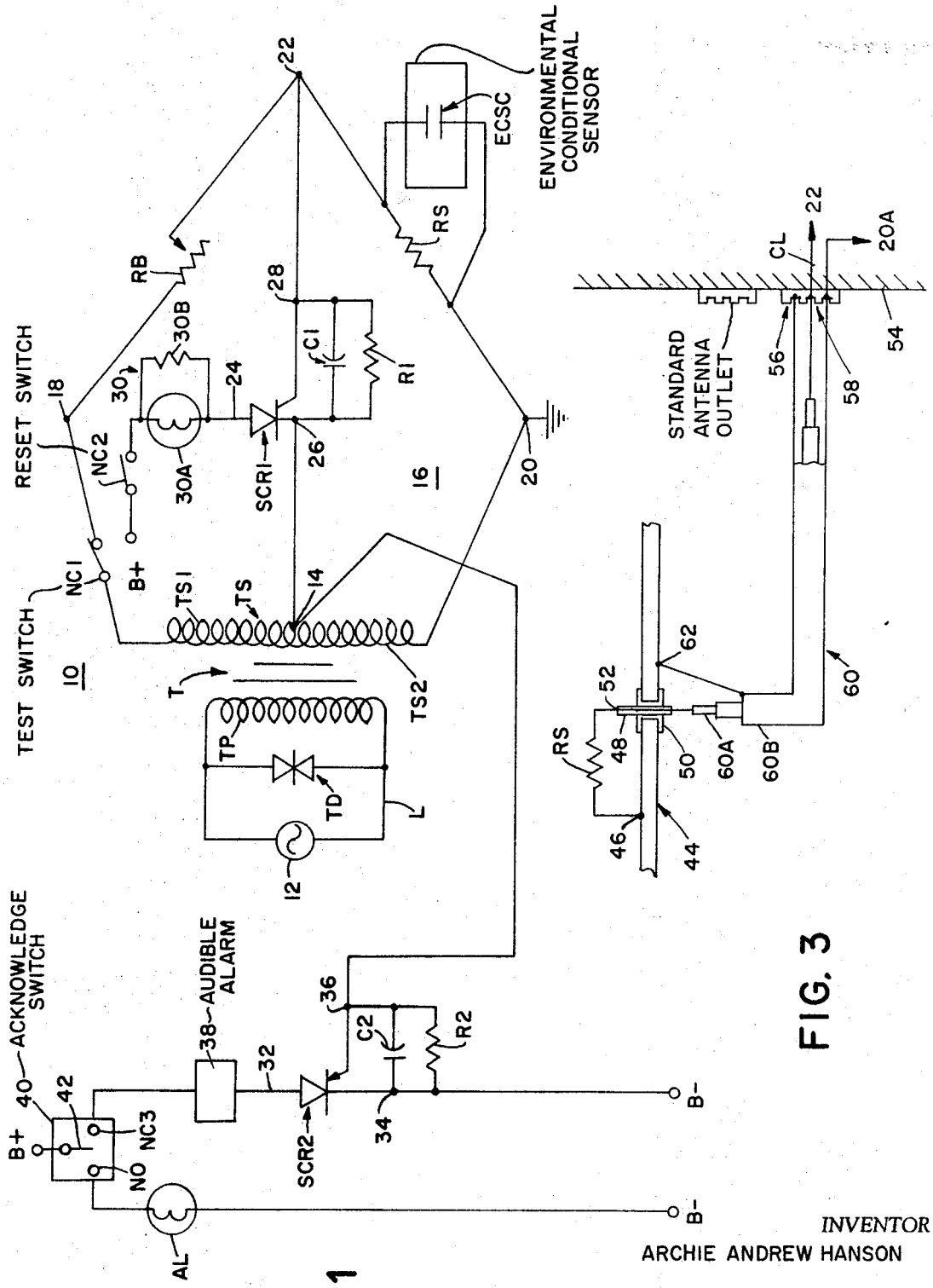

This invention relates to alarm devices and, more particularly, to theft prevention and environmental condition detecting devices including an electrical sensing element in the device or area protected, said sensing element being connected in an alarm circuit in such a way that any attempt to remove the device protected, any tampering with the electrical sensing element, or the occurrence of a given environmental condition will affect an alarm indication at a central location that a particular protected device at a particular remote location is being tampered with or that an undesirable condition exists in a particular monitored area.

The present invention will be described primarily with reference to the prevention of the theft of television sets from the various rooms of hotels and motels, although it is to be expressly understood that other appliances can also be monitored for theft prevention by the present invention; and will be further described with reference to fire detection in particular areas.

Existing alarms for the prevention of theft of televisions and the like and indication of room fires in places of public lodging are generally unsatisfactory.

All such theft prevent alarms, in order to be adequate, must have the basic qualities of simplicity, low cost, safety of operation and be virtually impossible to defeat. The virtual impossibility to defeat such alarms is a stringent requirement, since a guest in a place of public lodging has substantially unlimited time to analyze any alarm system by such means as removing the back panel of the television set to determine the exact nature of the alarm system.

By way of example, some prior art alarm systems are mounted on the back or sides of the television set and are easily defeated by removal of the back of the set or by removal of the alarm device from the side of the set.

Alarms that are activated by disconnection of the A.C. power cord to the set have been found to be easily defeated as well as being subject to malfunction due to power failure.

Alarms that utilize relays as sensors, require relatively high currents, are relatively easy to defeat and are dangerous in their potential to shock persons who may innocently mishandle the associated television set.

Alarms utilizing mechanical switch devices as sensors either internally or externally of the television set protected thereby, are subject to easy defeat.

It is, therefore, an object of the present invention to provide a new and novel theft prevention alarm circuit and system for electric appliances which is virtually impossible to defeat.

Another object of this invention is to provide a new and novel theft prevention alarm circuit and system for electrical appliances wherein, at a central location, the location of a remote appliance being tampered with is instantaneously indicated.

Still another object of this invention is to provide a new and novel theft prevention alarm circuit and system comprised of a plurality of circuit modules, wherein each circuit module monitors, from a central location, the condition of a plurality of remotely located electrical appliances.

Still another object of this invention is to provide a new and novel theft prevention alarm circuit and system wherein the sensing element for each appliance being monitored from a central location comprises a passive electric circuit element within each said appliance and wherein the responsive elements in said circuit and system comprise solid-state switch means.

Still another object of this invention is to provde a new and novel theft prevention alarm circuit and system wherein a new and novel alternating current bridge circuit is provided as a sensing means, said bridge circuit having a first pair of bridge arms common to all of a plurality of appliances being monitored and a like plurality of second bridge arm pairs associated one pair with each of the plurality of appliances being monitored; and wherein all elements of the said circuit and system, with the exception of a single bridge arm in each of said second bridge arm pairs, are located at a common central location.

Yet another object of this invention is to provide a new and novel theft prevention alarm circuit and system wherein a new and novel alternating curret bridge circuit is provided as a sensing means, said bridge circuit having a first pair of bridge arms common to all of a plurality of appliances being monitored and a like plurality of second bridge arm pairs associated one pair with each of the plurality of appliances being monitored; wherein all elements of the said circuit and system, with the exception of a single bridge arm in each of said second bridge arm pairs, are located at a common control location; and, further, wherein said circuit and system include alarm acknowledge, reset and modular testing means.

Yet another object of this invention is to provide an alarm system in keeping with the foregoing objects which is readily convertible to an environmental condition sensing alarm system.

These and other objects of the present invention will become more fully apparent with reference to the following specification and drawings which relate to a preferred embodiment of the present invention.

Figure 2:
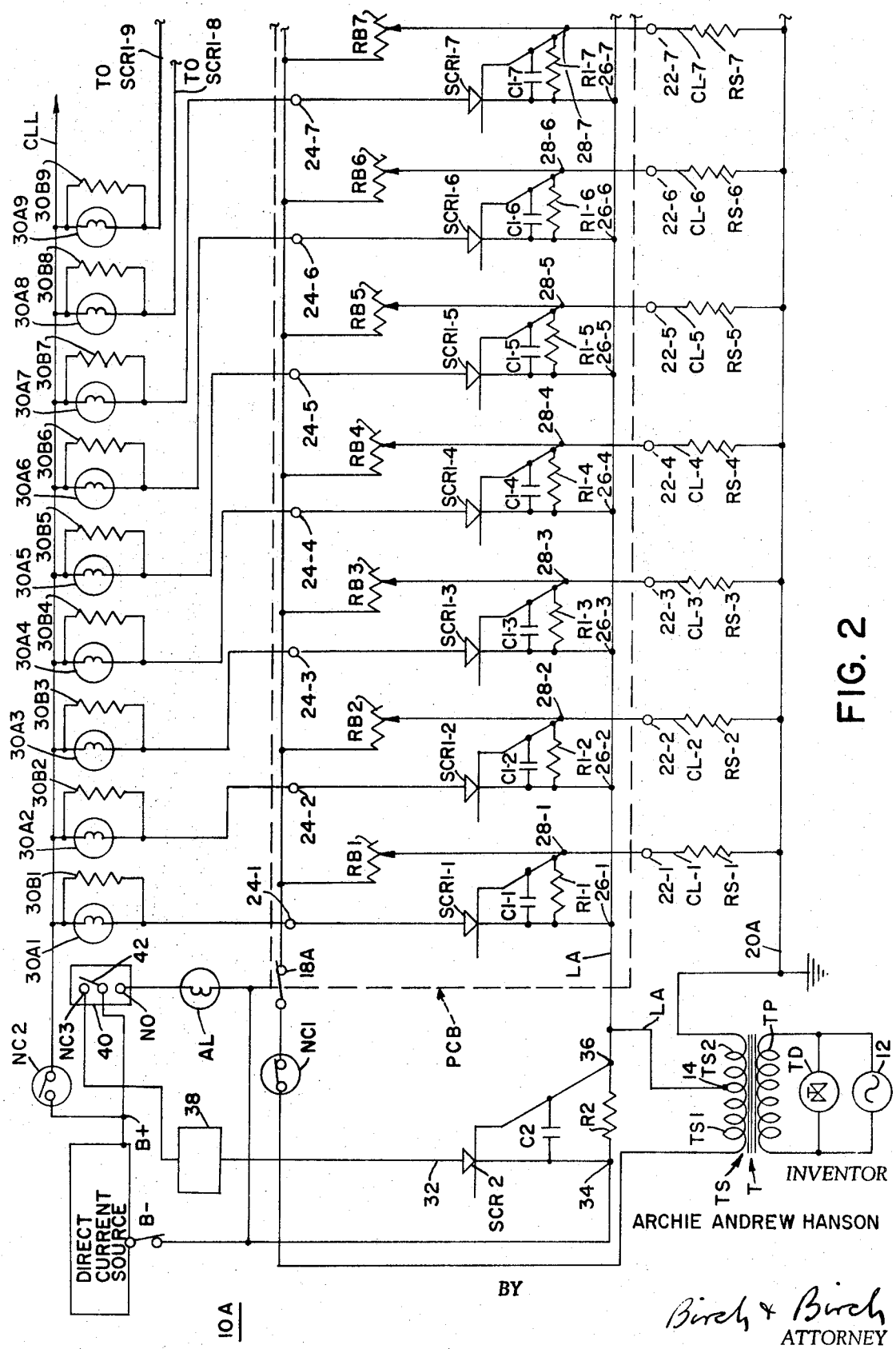

In the drawings:
FIG. 1 is a simplified schematic of the alarm system of the present invention illustrating a sensing bridge circuit for a single monitored appliance and an audible alarm device, including an environmental condition sensor shown in phantom lines;
FIGS. 2 and 2A comprise a detailed schematic of the alarm circuit and system of the present invention illustrating a modular grouping of sensors in the sensing bridge circuit generally illustrated in FIG. 1; and FIG. 3 is a schematic detail indicating the form of connection of a sensing resistance of the schematics of FIGS. 1 and 2 to the chassis of a television set or the like.

Basically, the invention contemplates the use of a balanced alternating current bridge circuit having a common first pair of bridge arms comprising the halves of a center-tapped transformer secondary winding and for each television set monitored, a second pair of bridge arms comprising a fixed value inset resistance and an adjustable resistance for balancing the effect, on the bridge circuit, the lead length from the second pair of arms to a central alarm panel. Unbalance in the bridge is detected by first solid state switches, one for each television set being monitored. The first solid state switches effect energization of visual alarm lights in a central panel which identify the respective sets as to location; and, further, each of said first solid state switches effect energization of a common second solid state switch to trigger a centrally located audible alarm to call attention to the visual identifying alarm lights in the panel. Acknowledge circuitry to effect manual override of the audible alarm and test circuitry effecting performance tests of modular groups of the said second pair of bridge arms in the overall alarm circuit are included, along with reset means for selectively terminating an alarm cycle.

Referring in detail to the drawings, and more particularly to FIG. 1, a single unit alarm circuit 10 is shown as including a direct current source, indicated by B+ and B— for its positive and negative terminals, respectively, and an alternating current source 12, which is preferably separate and distinct to the system, i.e., is not directly related to the normal source of A.C. power at its location.

Voltage levels are maintained on both positive and negative half-cycles of the A.C. source 12 by means of a thyrector TD connected across its terminals in parallel with the primary winding TP of a transformer T fed by the A.C. source 12.

The secondary winding TS of the transformer T comprises first and second winding halves TS1 and TS2 defined by a center tap 14 thereon, common to both said winding halves TS1 and TS2.

The first and second winding halves TS1 and TS2 comprise a first pair of bridge arms in an A.C. impedance bridge 16 and have their free ends connected, respectively, to first and second bridge input terminals 18 and 20, the latter comprising the ground terminal for the bridge circuit 16. The first winding half TS1 is connected to the first bridge input terminal 18 through a first normally closed switch NC1.

A variable balancing resistance RB is connected from the first bridge input terminal 18 to a second bridge output terminal 22, the first bridge output terminal comprising the center tap 14.

A fixed value sensing resistance RS is connected from the second bridge output terminal 22 to the second bridge input terminal 20.

Thus, the bridge diagonals 18–20 and 14–22 are established as the input and output diagonals, respectively, of the A.C. bridge circuit 16.

The resistances RB and RS thus comprise a second pair of bridge arms having the second output terminal 22 as a common connection therebetween.

A first silicon controlled rectifier SCR1, hereinafter referred to as the SCR1, having anode, cathode and gate terminals 24, 26 and 28, respectively, is connected in the A.C. bridge circuit 16 with its gate-cathode circuit across the bridge output diagonal 14–22. The cathode and gate terminals 26 and 28 of the SCR1 are directly connected to the first and second bridge output terminals 14 and 22, respectively. The gate-cathode circuit of the SCR1 includes a capacitance C1 and resistance R1 connected in parallel from the cathode terminal 26 to the gate terminal 28. The values of R1 and C1 are chosen to preclude spurious triggering of the SCR1 as will be hereinafter more fully described.

The anode terminal 24 of the SCR1 is connected through a visual alarm means 30 and a second normally closed switch NC2 to the positive terminal B+ of the direct current source.

The visual alarm means 30 comprises an incandescent lamp 30A and a fail-safe resistance 30B in shunt with the said lamp 30A, both said lamp and fail-safe resistance being in series with the second normally closed switch NC2 between the positive terminal B+ and the anode terminal 24 of the SCR1.

This completes the visual alarm and detection portion of the alarm circuit 10.

The audible alarm portion of the alarm circuit 10 includes a second silicon controlled rectifier SCR2, hereinafter referred to as the SCR2, having anode, cathode and gate terminals 32, 34 and 36, respectively. The gate terminal 36 is connected directly to the cathode 26 of the SCR1 through a lead L and first bridge output terminal 14.

The cathode 34 of the SCR2 is directly connected to the negative terminal B— of the direct current source and, further, is connected to the gate terminal 36 of the SCR2, to complete the gate-cathode circuit of the latter, by a capacitance C2 and a resistance R2 in parallel with the capacitance C2.

As in the case of the resistance-capacitance network R1–C1 at the SCR1, the resistance-capacitance network R2–C1 at the SCR2 is for the purpose of preventing spurious triggering of the SCR2 as will be more fully described hereinafter.

The cathode 34 of the SCR2 is directly connected to the negative side B— of the direct current supply.

The anode 32 of the SCR2 is connected to one side of an audible alarm means 38, such as a bell, buzzer, horn or the like. The other side of the audible alarm means 38 is connected to the normally closed contact NC3 of a single-pole, double-throw acknowledge switch 40, the latter having a normally open contact NO and a moving contact 42, the latter being directly connected to the positive side B+ of the direct current source.

The engagement of the normally open contact NO by the moving contact 42 of the acknowledge switch 40 completes a visual ackowledge circuit from the positive side B+ of the direct current source, through moving contact 42 and normally closed contact NO, thence through an acknowledge lamp AL to the negative side B— of the direct current source.

The sensing resistance RS can be combined with an environmental condition sensing unit ECS, adapted to respond to temperature, air pollutants and the like to effect closing of a pair of normally open contacts ESCS to complete a shunt circuit across the bridge terminals 20 and 22 and hence, the sensing resistance RS to energize the alarm circuit as hereinafter described. This condition is substantially identical to the short circuiting effect described in "Case No. 2" in the description of operation of the alarm system of FIGS. 1, 2 and 2A.

The basic alarm circuit 10 of FIG. 1, can be modularized to monitor, from a central control panel, a plurality of television sets or other remote appliances scattered throughout a building or building complex at predetermined locations.

Such an arrangement will now be described with reference to FIGS. 2 and 2A, wherein like elements to the embodiment of FIG. 1 bear like numerals, each with an appropriate suffix to indicate order of plurality.

As shown in FIGS. 2 and 2A, the bridge input terminals 18 and 20 of FIG. 1 are now shown as common circuit leads 18A and 20A, respectively, the latter comprising a common ground connection for the multiple alarm circuit 10A of FIG. 2.

The winding halves TS1 and TS2 of the secondary winding TS on the transformer T still comprise a first pair of bridge arms with the center tap 14 comprising a common first bridge output terminal, and with the outer ends of the winding halves TS1 and TS2 being connected to the common bridge input terminals 18A and 20A.

In this embodiment, there is a plurality of second pairs of bridge arms comprised of a plurality of balancing resistances RB1 . . . RB10 connected from the common first bridge input terminal 18A to respective ones of a plurality of second bridge output terminals 22–1 . . . 22–10; and further comprised of a plurality of sensing resistances RS1 . . . RS10 connected from respective ones of said second bridge output terminals 22–1 . . . 22–10 to the common second bridge input terminal 20A. Thus, as shown, there are ten (10) pairs of bridge arms connected in parallel between the common bridge input terminals 18A and 20A.

The common bridge output terminal 14 is connected through a common lead LA to the cathode 36 of the SCR2 and to all of the cathodes 26–1 . . . 26–10 of the SCR–1 . . . SCR–10, the latter being associated with the plurality of pairs of second bridge arms by having the gate terminals 28–1 . . . 28–10 thereof directly connected, respectively, to the plurality of second bridge output terminals 22–1 . . . 22.–10.

The anodes 24–1 . . . 24–10 of the SCR1–1 . . . SCR1–10 are connected to one side of the respectively associated visual alarm lamps 30A1 . . . 30A10 and their parallel-connected fail-safe resistances 30B1–30B10, respectively.

The cathodes 26–1 . . . 26–10 of the SCR1–1 . . . SCR1–10 are directly connected through the common lead LA to the common first bridge output terminal 14 and the cathode 34 of the SCR2 to complete the alarm circuit 10A.

In the circuit 10A, the alarm lamps 30A1 . . . 30A10, fail-safe resistances 30B1 . . . 30B10, switch 40, first and second normally closed switches NC1 and NC2, audible alarm means 38, acknowledge lamp 40, the SCR2 and the transformer T and its related circuitry are all included at a central indicating or master panel, not shown, from which the entire alarm circuit 10A can be tested, controlled and monitored. This will be more fully described in the description of operation of the invention.

The sensing resistances RS1 . . . RS10 are individually located in the various appliances to be monitored by the alarm circuit 10A. The manner of incorporating these sensing resistances in these appliances will be later described in detail with reference to FIG. 3.

The balance of the circuit 10A is located at the central control panel but is distinguished in the fact of its modular construction.

For each selected plurality of appliances to be monitored, ten as specifically illustrated in FIG. 2, a printed circuit board PCB is provided. This is indicated in phantom lines in FIG. 2.

The printed circuit board PCB contains all of the following components of the alarm circuit 10A:

the SCR1–1 . . . SCR1–10 and the associated R1–1 . . . R1–10 and C1–1 . . . C1–10 networks thereof;
the balancing resistances RB1 . . . RB10;
the common first bridge input terminal lead 18A;
the common cathode connecting lead LA for the SCR1–1 . . . SCR1–10; and
the external connections or terminals for the cathodes 28–1 . . . 28–10 and anodes 24–1 . . . 24–10 of the SCR1–1 . . . SCR1–10 the external terminal connections for the said cathodes comprising the plurality of second bridge output terminals 22–1 . . . 22–10.

Because of the remote locations of the sensing resistances RS1 . . . RS10 from the printed circuit board PCB for each module of appliances monitored, connecting leads CL1 . . . CL10 of various lengths are provided for connecting one side of the said sensing resistances RS1 . . . RS10 to the respectively associated second bridge output terminals 22–1 . . . 22–10. This fact occasions the need for the balancing resistances RB1 . . . RB10 as will be more fully described hereinafter.

As indicated adjacent the tenth visual alarm lamp 30A10, a common lead CLL for the alarm lamps 30A1 . . . 30A10 can be extended to additional pluralities of alarm lamps (not shown), i.e., to as many groups of alarm lamps as there are printed circuit boards PCB.

Further, the common ground lead 20A is intended to be common to all of the sensing resistances RS as indicated adjacent the tenth sensing resistance RS10.

Thus, any number of alarm modules represented by the circuit board PCB may be placed in the alarm circuit by the four common connections 18A, 20A, LA and CLL, assuming that the individual visual alarms 30 and sensing resistance connecting leads CL have been connected to the printed circuit boards PCB.

In order to make the alarm circuits 10 and 10A virtually tamper proof, the connection of the sensing resistances RS in each of the appliances to be monitored is a critical feature of the present invention.

The environmental condition sensing unit ECS and the normally open switch contacts ESCS thereof, as previously defined in the embodiment of FIG. 1, are shown adjacent the ninth sensing resistance RS9 in phantom lines. The normally open switch contacts ESCS are shown connected in shunt with the said ninth sensing resistance RS9 to effect a short circuit of that sensing resistance upon the occurrence of a predetermined environmental condition. The operation is thus substantially identical to that of "Case No. 2" in the following description of operation.

Referring now to FIG. 3, an appliance chassis 44 is schematically shown as having one side of a sensing resistance RS conductively coupled thereto by a suitable fitting or solder joint 46. A conductive terminal post 48 extends through the chassis 44 in electrical isolation therefrom through a suitable dielectric bushing or fitting 50 and one end of the said conductive post 48 is electrically connected to the other end of the sensing resistance RS by a solder joint or other suitable conductive connection 52.

The chassis 44 may be located in a room of a motel or the like, which room includes a wall 54 having a standard antenna outlet 56 therein, the latter having two connecting sockets for the said appliance. One of the connecting sockets (not shown) is for a standard master antenna connection while the other socket 58 is adapted for a coaxial cable connection to the chassis 44 and sensing resistance RS.

In the embodiment shown, the central or inner portion of the socket 58 comprises a connection for one of the common leads CL(CL1 . . . CL10) to extend to the second bridge output terminal 22(22–1 . . . 22–10) while the external or outer portion of the socket 58 comprises a connection for the common ground lead 20A, i.e., the common second bridge input terminal.

A coaxial cable 60 extends from the wall socket 58 to the chassis fitting 50 with the internal conductor 60A directly connected to the conductive post 48 to complete the connection between the sensing resistance RS, connecting lead CL and second bridge output terminal 22 through the wall socket 58. The outer conductor 60B of the coaxial cable 60 is connected directly to the chassis 44 by means of a connection 62 at the fitting 50, to complete the connection between the sensing resistance RS and the common ground lead (common second bridge output terminal) 20A.

OPERATION

There are several ways in which would-be burglars attempt to steal monitored appliances and defeat the alarm systems monitoring such appliances. These are as follows:

(1) Breaking the coaxial cable connection 60 (FIG. 3) which is equivalent to breaking one of the connecting leads CL1 . . . CL10 to the sensing resistances RS1 . . . RS10 of FIG. 2 or actually removing a sensing resistance RS from an appliance.

(2) Short circuiting the coaxial connection 60 or shunting the sensing resistance RS in FIG. 3, this being representative of shunting any one of the resistances RS, RS1 . . . RS10 in FIGS. 1 and 2.

(3) Removing a sensing resistance RS, RS1 . . . RS10 from an appliance after first shunting the resistance with a sufficiently high value of resistance so as not to trigger the alarm when the shunt resistance is inserted.

The following operating parameters for the alarm circuits 10 and 10A of FIGS. 1 and 2, respectively, are as follows:

Voltage between the positive (B+) and negative (B—) terminals of the direct current source—28 volts,
A.C. voltage across each of the winding halves TS1 and TS2—4 volts
Sensing resistance RS (RS1 . . . RS10)—2700 ohms (5%)
Balancing resistance RB (RB1 . . . RB10)—5000 ohms maximum
The SCR1—G.E. Type G106F2
Capacitance C1—0.47 microfarads (10 v.)
Resistance R1—1000 ohms (¼ w.)
The SCR2—G.E. Type C106G2
Capacitance C2—0.47 microfarads (150 v.)
Resistance R2—10 ohms microfarads (20 w.).

Referring jointly to FIGS. 1 and 2, and most specifically to FIG. 2, the alarm circuits 10 and 10A are first balanced to a quiescent no-alarm state by adjusting the balancing resistances RB, RB1 . . . RB10 to preclude an alarm condition for any of the appliances being monitored. This is necessary in the circuit 10A since the connecting leads CL1 . . . CL10 for the sensing resistances RS1 . . . RS10 are all of a different length between the common second bridge output terminal 22A and the said sensing resistances Thus the added resistance effect of the length of the leads CL1 . . . CL10 must be balanced for each appliance being monitored to preclude spurious triggering of the SCR1–1 . . . SCR1–10 and the SCR2; such triggering to be described hereinafter.

Assuming a balanced no-alarm condition, the operation of the embodiment of FIG. 1 will now be described for each of the attempted theft conditions of a monitored appliance. For the purpose of this description it is to be assumed that the details of FIG. 3 are incorporated in the embodiment of FIG. 1.

Case No. 1

If the coaxial connector 60 is broken or removed, i.e. the circuit between the sensing resistance RS and the second bridge output terminal 22 is broken, the apparent value of the sensing resistance RS to the bridge circuit 16 will be infinite. This is also the case when the sensing resistance RS is bodily removed or disconnected at either end thereof.

This will unbalance the bridge circuit 16 as is well known in the art, causing a voltage proportional to the unbalance to appear across the bridge output terminals 14 and 22 on both half cycles of applied A.C. power.

On the positive half cycles, wherein the said first and second output terminals are both positive with respect to ground 20, the unbalance voltage will be applied across the gate-cathode path 28–26 of the SCR1 and the resistance R1, causing current to flow into the gate 28 and trigger the SCR1 into its "ON" state as is well known in the art.

This creates a conductive anode-cathode path 24–26 through the SCR1 and completes the circuit

NC2–30–24–26 from the positive terminal B+ of the D.C. source to the first bridge output terminal 14 and thence through the lead L to the gate terminal 36 of the SCR2.

Almost immediately, the SCR2 is triggered into conductivity by the application of direct current potential from the positive terminal B+ across the gate-cathode path 36–34 thereof and the resistance R2, since the cathode 34 is connected to the negative terminal B— of the D.C. source.

Thus, a conductive anode-cathode path 32–34 is created through the SCR2 completing another circuit

NC3–38–32–34 from the positive terminal B+ of the D.C. source to the negative terminal B— thereof.

The current flow through the SCR1 is maintained through the second resistance R2 in the gate circuit of the SCR2. Thus, both the SCR1 and SCR2 will remain "ON" after an initial gating signal has been applied thereto.

Accordingly, conduction of the SCR1 renders the visual alarm lamp 30A incandescent and conduction of the SCR2 activates the audible alarm means 38.

The operator at the central switchboard notes the visual indication as well as the audible indication and energizes the switch 40. This breaks the moving contact 42 from the normally closed contact NC3 of the switch 40 and causes it to make with the normally open contact NO.

This breaks the circuit of the audible alarm means 38 and precludes further current flow through the anode-cathode path 32–34 of the SCR2.

Therefore, the audible alarm means 38 is silenced and the SCR2 is turned "OFF." Acknowledgement of the activation of the audible alarm means 38 is provided, however, since the closing of the normally open contact NO connects the acknowledge lamp AL across the terminals B+ and B— of the D.C. source. The acknowledge lamp AL will thus remain illuminated until the alarm circuit is reset by the acknowledge switch 40.

If the visual alarm lamp 30A is defective, the system will still operate by means of the fail-safe resistance 30B in parallel therewith. This resistance is large enough to permit energization and illumination of the lamp 30A and small enough to establish and maintain a sustaining forward current through the SCR1.

Case No. 2

If the sensing resistance RS is short-circuited in an attempt to remove a monitored appliance, the second bridge output terminals 22, on negative half-cycles of the A.C. voltage in the half windings TS1 and TS2, will be at ground potential and the first bridge output terminal 14 will be below ground potential. This results in a flow of current through the gate resistance R1 and into the gate 28 of the SCR1, thereby initiating the audible and visual alarm functions previously described in Case No. 1.

Case No. 3

If a sufficiently high value of resistance is placed in shunt with the sensing resistance RS, the alarm may not be triggered. This is because the resistance presented by such a combination is virtually the same as that presented by the sensing resistance RS alone.

However, any value of resistance which will materially change the resistance presented between the bridge terminals 20 and 22 will cause the alarms in the alarm circuit 10 to be energized.

Therefore, removal of the sensing resistance RS after it has been shunted by a large value of resistance or shunting the sensing resistance RS will less than a sufficiently large value of resistance will result in the alarms being energized.

Referring now to FIG. 2, it can be readily seen that efforts to defeat the alarm circuit 10A at the location of any of the sensing resistances RS1 . . . RS10 will result in the energization of the audible alarm means 38 and the illumination of the specific alarm lamp 30A1 . . . 30A10 which will indicate to the operator at the central control panel the exact location of the attempted theft or tampering wih a monitored appliance. For example, the alarm lamps 30A1 . . . 30A10 could be used to back-light room number indicating panels for visual readout of such a location.

In both of the foregoing embodiments, the alarm lamps 30A, 30A1 . . . 30A10 and the SCR1, SCR1-1 . . . SCR1-10 are reset by the second normally closed switch NC2 which is actuated to break the circuit which maintains forward sustaining current in the SCR1, SCR1-1 . . . SCR1-10.

Once this circuit is broken these circuit elements are turned "OFF."

In order to test the working order of the alarm circuits 10 and 10A, the first normally closed switch NC1 is opened. (In the circuit 10A of FIG. 2 there can be one such normally closed switch NC1 for each modular bank of visual alarm circuits, i.e., each printed circuit board PCB.)

When the switch NC1 is opened the bridge circuit 16 of FIG. 1 and all of the bridge circuits of the associated module in the circuit 10A of FIG. 2 are unbalanced such that the SCR1 and the SCR1-1 . . . SCR1-10 and the SCR2 are all triggered on the negative half-cycle of A.C. voltage applied to the second winding half TS2 of the transformer T.

In the case of the alarm circuit 10A, this provides the means wherein, if the visual alarm lamp 30A1 . . . 30A10 has failed, in an activated alarm circuit, all that one need do to locate the source of the alarm is to actuate the first switch NC1 to determine which bulb in the module is burned out. This will give the location of the attempted theft or tampering by process of elimination.

The use of sensing resistances RS, RS1 . . . RS10 with 5% tolerance permits the shifting of appliances equipped with such sensing resistances from one location to another without the need for rebalancing that particular second pair of bridge arms in which a new appliance has been connected.

The system of FIG. 2 will respond to more than one alarm even after the audible alarm means 38 has been acknowledged by illumination of the alarm lamp 30A1 . . . 30A10 representative of the location of the attempted theft or tampering.

The system is readily adaptable to the automated insertion of auxiliary power sources in the event of power failure.

Thus, as can be readily seen from the foregoing specification and drawings, the present invention provides a theft or tampering alarm system of optimum simplicity, optimum size, positive and foolproof operating principles and of optimally minimum cost of installation. Further, the system of the present invention utilizes relatively low voltages and currents to preclude any danger of injury to persons utilizing the appliances monitored thereby. The system of the present invention is virtually impossible to defeat by would-be burglars, which, in conjunction with the foregoing features of desirability, satisfies a long-felt need in the art for such an alarm device.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. A protective alarm circuit for electrical appliances and the like providing an indication of the facts of tampering, attempted removal and the location of the device protected comprising, in combination:
an alternating current power source;
a direct current power source having positive and negative output terminals;
an alternating current bridge circuit including a first pair of bridge arms of substantially equal impedance connected across said alternating current power source and having a first common terminal connection therebetween;
said bridge circuit including an additional pair of bridge arms for each device to be monitored connected across said alternating current power source, each said additional pair of bridge arms including a second common terminal connection therebetween;
one arm of each said additional pair of bridge arms comprising a fixed value resistance means adapted to be integrally incorporated in a device to be monitored, one end of said fixed resistance means being connected to said second common terminal connection and the other end thereof being connected to a common electrical ground connection with said device;
the other arm of each said additional pair of bridge arms comprising a variable resistance means adapted to balance said bridge circuit to effect a predetermined minimum potential difference between said first and second common terminal connections;
first controlled semiconductor rectifier means having anode, cathode and gate terminals;
an additional controlled semiconductor rectifier means for each said additional pair of bridge arms having anode, cathode and gate terminals, the gate terminal thereof being connected to said second common terminals of the respectively associated additional pair of bridge arms, the cathode terminal thereof being connected to said first common terminal;
a visual alarm means connected in series between said positive terminal of said direct current source and said anode terminal of each said additional controlled rectifier means;
said gate terminal of said first controlled rectifier means being connected to said first common terminal and the cathode terminal thereof being connected to the negative terminal of said direct current source;
first impedance means in circuit between the gate and cathode terminals of said first controlled rectifier means comprising a closed circuit path from the cathode terminal of each additional controlled rectifier means to said negative terminal;
additional impedance means in circuit between the gate and cathode terminals of each additional controlled rectifier means comprising a closed circuit path between said first common terminal and each said additional common terminal;
and audible alarm means connected in series between said positive terminal and the anode terminal of said first controlled rectifier means.

2. The invention defined in claim 1, wherein said alarm circuit further includes acknowledge means selectively de-energizing said audible alarm means and effecting visual indication of the fact of energization of said audible alarm means.

3. The invention defined in claim 1, wherein said alarm circuit further includes acknowledge means selectively de-energizing said audible alarm means and effecting visual indication of the fact of energization of said audible alarm means: said acknowledge means comprising selective switch means having a normally closed circuit path in series between said positive terminal and said audible alarm means, and a normally open circuit path; and visual indicator means; said selective switch means effecting selective connection of said visual indicator means across said positive and negative terminals through said normally open circuit path.

4. The invention defined in claim 1, wherein an alarm circuit further includes normally closed reset switch means in series between said positive terminal and said visual alarm means.

5. The invention defined in claim 1, wherein said alarm circuit further includes normally closed test switch means in series between one of said first pair of bridge arms and the said other arms of each said additional pair of bridge arms.

6. The invention defined in claim 1, wherein said alarm circuit further includes acknowledge means selectively deenergizing said audible alarm means and effecting visual indication of the fact of energization of said audible alarm means; wherein an alarm circuit further includes normally closed reset switch means in series between said positive terminal and said visual alarm means; and further wherein said alarm circuit further includes normally closed test switch means in series between one of said first pair of bridge arms and the said other arms of each said additional pair of bridge arms.

7. The invention defined in claim 1, wherein said alarm circuit further includes acknowledge means selectively deenergizing said audible alarm means and effecting visual indication of the fact of energization of said audible alarm means; said acknowledge means comprising selective switch means having a normally closed circuit path in series between said positive terminal and said audible alarm means, and a normally open circuit path; and visual indicator means; said selective switch means effecting selective connection of said visual indicator means across said positive and negative terminals through said normally open circuit path; wherein an alarm circuit further includes normally closed reset switch means in series between said positive terminal and said visual alarm means; and further wherein said alarm circuit further includes normally closed test switch means in series between one if said first pair of bridge arms and the said other arms of each said additional pair of bridge arms.

8. The invention defined in claim 1, wherein said first pair of bridge arms comprise the winding halves of a center-tapped transformer secondary winding; and wherein said first common terminal connection comprises the center tap of said secondary winding.

9. In an alarm circuit including an alternating current impedance bridge having a condition responsive impedance element as one leg thereof, said bridge further having an input diagonal and an output diagonal, the invention comprising, in combination:
    a source of direct current power;
    visual alarm means;
    audible alarm means;
    first semiconductor switch means in circuit across said output diagonal and with said source and said visual alarm means, becoming conductive and effecting a closed circuit from said source through said visual alarm means in response to an unbalance in said bridge circuit; and
    second semiconductor switch means in circuit with said first semiconductor switch means, said source and said audible alarm means becoming conductive and effecting a closed circuit from said source through said audible alarm means in response to a conductive state in said first semiconductor switch means.

10. The invention defined in claim 9, wherein said first and second semiconductor switch means each comprise a silicon controlled rectifier having anode, cathode and gate terminals and include
    first and second impedance means interconnecting the gate and cathode terminals of said first and second semiconductor switch means, respectively;
    wherein the gate-cathode path of said first semiconductor switch means is connected across said output diagonal of said bridge;
    wherein the cathode terminal of said second semiconductor switch means is connected to one side of said source; and
    wherein said anode terminals of said first and second semiconductor switch means are connected to the other side of said source through said visual and audible alarm means, respectively.

11. The invention defined in claim 10, wherein said combination further includes normally closed reset switch means in series between said other side of said source and said visual alarm means.

12. The invention defined in claim 10, wherein said combination further includes acknowledge means selectively deenergizing said audible alarm means and effecting visual indication of the fact of energization of said audible alarm means; said acknowledge means comprising reset switch means having a normally closed circuit path between said other side of said source and said visual alarm means, visual indicator means, and a normally open circuit path; said reset switch means effecting selective connection of said visual indicator means across said source through said normally closed circuit path and substantially simultaneous breaking of said normally closed circuit path.

13. The invention defined in claim 10, wherein said combination further includes acknowledge means selectively deenergizing said audible alarm means and effecting visual indication of the fact of energization of said audible alarm means; said acknowledge means comprising reset switch means having a normally closed circuit path between said other side of said source and said visual alarm means, visual indicator means, and a normally open circuit path; said reset switch means effecting selective connection of said visual indicator means across said source through said normally closed circuit path and substantially simultaneous breaking of said normally closed circuit path; and wherein said combination further includes normally closed reset switch means in series between said other side of said source and said visual alarm means.

14. The invention defined in claim 9, wherein said combination further includes normally closed reset switch means in circuit with said first semiconductor switch means and said visual alarm means.

15. The invention defined in claim 9, wherein said combination further includes acknowledge means selectively deenergizing said audible alarm means and effecting visual indication of the fact of energization of said audible alarm means; said acknowledge means comprising rest switch means having normally closed contacts in circuit with said source, said audible alarm means and said second semiconductor switch means, normally open contacts, and visual indicator means; said reset switch means effecting selective connection of said visual indicator means across said source through said normally open contacts and substantially simutaneously said circuit through said normally closed contacts.

16. The invention defined in claim 9, wherein said combination further includes acknowledge means selectively deenergizing said audible alarm means and effecting visual indication of the fact of energization of said audible alarm means; said acknowledge means comprising reset switch means having normally closed contacts in circuit with said source, said audible alarm means and said second semiconductor switch means, normally open contacts, and visual indicator means; said reset switch means effecting selective connection of said visual indicator means across said source through said normally open contacts and substantially simultaneously said circuit through said normally closed contacts; and wherein said combination further includes normally closed reset switch means in circuit with said first semiconductor switch means and said visual alarm means.

17. The invention defined in claim 9, wherein said bridge circuit includes a plurality of bridge arms; one of said bridge arms including a fixed value sensing resistance in series therein and adapted to be located at a relatively remote area to be monitored by said alarm circuit; said bridge circuit being responsive to conditions externally imposed on said sensing resistance at said remote area to effect an unbalance in said bridge circuit and energization of said audible and visual alarm means.

References Cited

UNITED STATES PATENTS

| | | | |
|---|---|---|---|
| 3,381,286 | 4/1968 | Walsh | 340—213.1 |
| 3,407,400 | 10/1968 | Lurie | 340—280 |
| 3,439,359 | 4/1969 | Sliman | 340—280 |
| 3,447,145 | 5/1969 | Schumann | 340—214 |
| 3,495,231 | 2/1970 | Yoshiaki Takaya et al. | 340—213 |

DONALD J. YUSKO, Primary Examiner

J. M. BOBBITT, Assistant Examiner

U.S. Cl. X.R.

340—233, 280, 285